United States Patent [19]

Kai et al.

[11] Patent Number: 4,532,271

[45] Date of Patent: Jul. 30, 1985

[54] BITUMINOUS PAVING MATERIAL AND A METHOD FOR THE PREPARATION THEREOF

[75] Inventors: Isao Kai, Aichi; Sumiaki Ichikawa, Tokyo; Yozo Mihara, Aichi, all of Japan

[73] Assignee: Asahi Yukizai Kogyo Kabushiki Kaisha, Nobeoka, Japan

[21] Appl. No.: 551,708

[22] Filed: Nov. 14, 1983

[30] Foreign Application Priority Data

Dec. 30, 1982 [JP] Japan ................................. 57-228281

[51] Int. Cl.$^3$ ......................... C08K 3/36; C08K 9/10; C08L 61/06; C08L 95/00
[52] U.S. Cl. .................................. 523/208; 523/216; 524/59
[58] Field of Search ............... 523/208, 214, 216, 200; 524/59

[56] References Cited

U.S. PATENT DOCUMENTS 3,855,167 12/1974 Bowman ............................. 523/208

*Primary Examiner*—Allan M. Lieberman
*Attorney, Agent, or Firm*—Brisebois & Kruger

[57] ABSTRACT

The performance of an asphaltic paving material can be greatly improved when the paving material is prepared by first coating the particles of the aggregate material with a molten phenolic resin and then mixing the thus resin-coated aggregate material with asphalt and the like bituminous material. The phenolic resin is preferably modified with a phenoxy resin.

11 Claims, No Drawings

BITUMINOUS PAVING MATERIAL AND A METHOD FOR THE PREPARATION THEREOF

BACKGROUND OF THE INVENTION

The present invention relates to an improved bituminous paving material and a method for the preparation thereof. More particularly, the invention relates to a bituminous paving material containing aggregates and having greatly improved resistance against plastic flow which may lead to the depression or raveling of the paved road by ruts in the road surface.

As is well known, most of the modern roads are paved with a bituminous or asphaltic paving material and can withstand fairly satisfactorily the severest traffic conditions such as in the high-speed motorways as a result of the remarkable progress in the technology of road construction while also ensuring traffic safety. Such progress in road technology has resulted from integration of the technical aspects of structure design, formulation, materials and construction techniques.

Despite the great efforts of road engineers, however, no asphaltic pavement can meet all of the requirements of conditions of climate, road bed, traffic frequency and the like which may differ very widely from place to place. In particular, the most difficult problems to be solved are the raveling of the pavement by ruts in hot regions and wearing and crack formation of the pavement in cold regions, for which new proposals are being made one by one, directed to improvements in the paving materials but which do not provide a complete solution to the above problems.

A bituminous material is usually composed of aggregates in a wide range of sizes from coarse aggregates and fine aggregates to a stone powder or so-called filler including smashed rock, gravel, sand, crushed sand and the like material and a bituminous material such as natural asphalt, petroleum asphalt and the like as the matrix for the aggregates.

The amount of the aggregate material in the overall paving material is usually 90% by weight or more, or about 75% by volume or more. Road surfaces paved with these asphaltic paving materials cannot be free from the problem of surface deterioration such as sliding, raveling by ruts, undulation and crack formation as a result of frequent heavy vehicle traffic, dynamic loading and sudden braking, changing road bed conditions, temperature changes and the like, and wear from studded tires. In particular, the most serious drawbacks of the bituminous-paved road are depression by rutting in hot regions and wearing and crack formation in the road surface in cold regions.

With an object to solve the above mentioned problems, various attempts have been made to improve bituminous paving materials, as a first approach, by means of an appropriate selection of the aggregate materials and use of an asphalt-modifier agent. In particular, the aggregate material greatly influences the performance of the paving material since the aggregate material occupies about 75% or more of the overall volume of the paving material. In this regard, aggregate materials should be subject to most careful selection in respect of the particle size distribution, durability, wearing resistance, slipperiness, and content of mud and organic foreign materials, shapes of the particles, adhesion to asphalt and other characteristics. A guideline therefor is given in "Asphalt Paving Manual" published by the Japanese Road Association.

A second approach for the improvement of the asphaltic paving materials is concerned with the modification of the bituminous material as the binder of the aggregate and which occupies about 25% by volume of the paving material. For example, several improved bituminous materials suitable for pavement have been proposed including so-called semi-blown asphalts having increased viscosity at 60° C., rubber-containing asphalts mainly directed to the improvement of the toughness and tenacity, thermoplastic resin-containing asphalts mainly directed to the improvement of the flow resistance at elevated temperatures and the like as well as asphaltic materials used in combination with an epoxy or urethane resin as a specific organic binder.

In connection with the above described first approach for the improvement of the asphaltic paving materials, the proper selection of the aggregate material in respect of the particle size distribution is a matter to be determined according to the required density or use of the pavement as a necessary condition rather as an improvement. However, aggregate quality is frequently uneconomical unless the aggregate material is obtained near the site of the road construction and aggregate materials of low quality require expensive processing for improvement.

In connection with the second approach above described, most of the proposed methods for the improvement of the asphaltic material are directed in principle to increase of viscosity. For example, the semi-blown asphalt is prepared by blowing air into a molten straight asphalt for a long time so as to improve the heat sensitivity with an increased viscosity at 60° C. with an object to improve the flow resistance as a result of the increased viscosity. The rubber blended with the asphalt in the rubber-containing asphalt is partly dissolved in the asphalt but mostly dispersed in the matrix of the asphalt in the form of swollen rubber particles contributing to the improvement of the toughness and tenacity of the asphalt by virtue of the increased resistance against flowing. The function of the thermoplastic resin blended in the thermoplastic resin-containing asphalt is much the same as the above mentioned rubber in the rubber-containing asphalts as is taught in the "Asphalt Paving Manual".

On the other hand, some epoxy and urethane resins have chemical reactivity with asphalt as a specific additive to form a very strong asphalt concrete and many disclosures are given in the prior art. A problem in the additive resins of this type is the relatively short time available for working with the ready-mixed asphalt mixture since the reaction of the resin and the molten asphalt proceeds to reduce the workability of the mix.

Thus, all of the prior art methods for the improvement of asphalt by the addition of certain additives are directed to the hardening of the asphalt itself by the dispersion of a heterophase or by chemical reaction.

SUMMARY OF THE INVENTION

Deviating from the above described approaches in the prior art for the improvement of the bituminous paving materials, the inventors have conducted extensive investigations with the idea that the interrelationship between the aggregate material and the asphaltic matrix may play an important role in the performance of the paving material and have undertaken experiments on the effect of an additive used in a small amount as a modifier of the aggregate arriving at the completion of the present invention described hereunder.

Thus, an object of the present invention is to provide an improved asphaltic paving material capable of imparting a road paved thereof with high resistance to raveling or deformation in the pavement due to heavy traffic conditions including the load by sudden braking as well as temperature elevation.

Another object of the present invention is to provide an improved asphaltic paving material capable of imparting a road paved thereof with increased rigidity so that crack formation and wearing of the pavement can greatly be reduced.

Thus, the improved bituminous paving material of the present invention comprises a bituminous material and an aggregate material uniformly admixed with and dispersed in the bituminous material as the matrix, the particles of said aggregate material being coated with a phenolic resin.

Further, the method of the invention for the preparation of the above described improved bituminous paving material comprises blending an aggregate material with a molten phenolic resin at a temperature higher than the melting point of the resin to have the particles of the aggregate material coated with the phenolic resin, and blending the aggregate material composed of the thus coated particles with a bituminous material.

Although the type of the above mentioned phenolic resin is not particularly limitative, a preferable one is a phenoxy resin-modified phenolic resin so that further improvements can be obtained in the decrease of raveling and deformation by virtue of the higher rigidity of the phenoxy resin.

DETAILED DESCRIPTION OF THE PREFERRED EMBODIMENTS

As is described above, the inventive bituminous paving material comprises a bituminous material as the matrix and aggregate particles precoated with a phenolic resin and dispersed in the bituminous material. The mechanism by which the inventive paving material is imparted with greatly improved resistance against plastic flow is scientifically not altogether clear but presumably an important and fundamental role is played by the wettability of the aggregate surface with the bituminous material, the adhesion therebetween and the strength of the resin enhanced by the precoating of the aggregate particles with the phenolic resin or, in particular, phenoxy-modified phenolic resin. As is known, phenolic resins have very strong polarity in the molecular structure and are highly adhesive to the surface of the aggregate particles with good wettability so that the resin film on the aggregate particles presumably has an effect to strengthen the aggregates and simultaneously acts as a primer in the interface between the aggregate particles and the bituminous material. Furthermore, phenolic resins are compatible and miscible with the bituminous material at least partly at an elevated temperature without complete separation between phases possibly contributing to the increase in the bonding strength between the aggregate particles and the bituminous material.

The phenolic resin suitable for use in the invention is not particularly limitative to a specific type and various types of phenolic resins may be used including novolak-type and resol-type ones as the two representative types as well as a variety of modified phenolic resins such as metal chelate-modified phenolic resins, alkyl-modified phenolic resins, benzyl ether-type phenolic resins, ammonia resol-type phenolic resins, phenoxy-modified phenolic resins and the like modified with other synthetic resins. These resins may be used either singly or as a combination of two kinds or more according to need.

As is mentioned before, one of the preferable phenolic resins used in the invention is a phenolic resin modified with a phenoxy resin which is typically expressed by the following structural formula

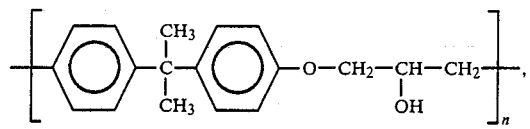

in which n is a positive integer in the range of, for example, 70 to 170, and substantially having no epoxy groups. The average molecular weight of the phenoxy resin should preferably be in the range from 25000 to 45000. The amount of the phenoxy resin used for the modification of a phenolic resin is usually from 3 to 30 parts by weight per 100 parts by weight of the latter. A phenoxy resin having a degree of polymerization, i.e. the number n in the above formula, smaller than 70 may sometimes contain residual epoxy groups having reactivity with the bituminous material so that the usable life of the asphaltic paving material is adversely affected. On the other hand, a phenoxy resin of excessively high degree of polymerization with the value of n larger than 170 has poor miscibility with phenolic resins and, moreover, the phenolic resin modified with such a phenoxy resin is less flowable when in a molten state to cause problems in the practical use thereof. When the amount of the phenoxy resin is smaller than 3 parts by weight per 100 parts by weight of the phenolic resin, the improvement in the performance of the asphaltic paving material, in particular, in respect of the value of the Marshal stability is insufficient in addition to the decrease in the resistance against wheel tracking. When the amount of the phenoxy resin used in the modification is larger than 30 parts by weight per 100 parts by weight of the phenolic resin, the solubility limit of the former in the latter is exceeded so that the resultant resin is hardly flowable even at high temperatures and cannot be discharged out of the vessel in which the modification of the phenolic resin has been undertaken.

The form of the phenolic resin is also not particularly limitative including solid resins at room temperature and liquid resins such as aqueous emulsions, aqueous solutions and varnish-like organic solutions as dissolved in an organic solvent.

A typical procedure for the preparation of the inventive bituminous paving material is as follows. Thus, 100 parts by weight of the aggregate material heated and kept at 160° to 200° C. and from 0.1 to 3 parts by weight or, preferably, from 0.2 to 2 parts by weight of the phenolic resin as solid are introduced into a mixer and they are thoroughly blended together for 5 to 60 seconds or, preferably, 5 to 30 seconds depending on the efficiency of the mixer to effect uniform coating of the aggregate particles with the molten phenolic resin leaving substantially no uncoated surface directly followed by introduction and blending of 3 to 10 parts by weight of the bituminous material heated at 130° to 160° C. or, preferably, at 140° to 150° C. to give the desired improved paving material. The temperature at which blending of the aggregate material and the molten phenolic resin is performed should preferably be higher by at least 60° C. than the melting point of the resin with decreased melt viscosity of the resin to facilitate blending although an excessively high temperature, e.g. 200° C. or higher, is undesirable due to the possible degradation of the asphalt mixed with the resin-coated aggregate before cooling to, for example, 160° C. or below.

The amount of the phenolic resin is limited to the above range because no desired improving effect can be obtained with a phenolic resin in an amount smaller than 0.1 part by weight while the use of a phenolic resin in an amount in excess of 3 parts by weight per 100 parts by weight of the aggregate material is undesirable due to the decrease in the workability of the resultant paving material in addition to the economical disadvantage.

The procedure for providing coating to the aggregate particles may be performed in several different ways. For example, the aggregate material and the phenolic resin are blended together at room temperature followed by heating of the blend along with mixing at a temperature higher than the melting point of the phenolic resin so that the aggregate particles may be uniformly coated with the molten resin. In short, any procedure can be undertaken provided that aggregate particles uniformly coated with the resin can be obtained by the method. It is essential that the introduction of the bituminous material should be performed when the aggregate particles have been uniformly coated with the phenolic resin.

In the above description for effecting coating of the aggregate particles with the phenolic resin, it is assumed that the phenolic resin is solid at room temperature and it is melted by heating above the melting point thereof. When the phenolic resin is in a liquid form, on the other hand, the liquid medium in which the phenolic resin is dissolved or dispersed is first evaporated by heating to leave the resin as solid which is melted to coat the surface of the aggregate particles.

The phenolic resin forming the coating layer on the aggregate particles may be in a cured state or in an uncured state. The thickness of the coating layer of the resin on the aggregate particles can be easily controlled by suitably selecting the blending ratio of the aggregate material and the resin or by controlling the curing reaction of the phenolic resin.

In the following, the method of the present invention is described in further detail by way of examples.

EXAMPLE 1

A novolak-type phenolic resin having a melting point at about 100° C. was prepared in a known method by the condensation reaction of 470 kg of phenol and 255 kg of 47% formalin in the presence of oxalic acid as the catalyst followed by the removal of the unreacted phenol and formaldehyde as well as water and volatile matter by heating under reduced pressure. The thus prepared resin in the molten state was continuously spread on a belt conveyor by pouring through a punching plate having perforations of 3 mm diameter and was solidified by cooling. The solidified resin having a melting point at about 100° C. was shaped into rodlet-like forms of 2 mm diameter and 5 to 20 mm length.

An aggregate material of particles coated with the melt of the above prepared resin was prepared by introducing 1147 g of an aggregate obtained from hard sandstone and occurring in the River Ohi according to the formulation for the granular packing density of Ascon (13) and heated at 180° C. into a mixer followed by charging of 6.9 g of the phenolic resin and mixing for 60 seconds.

When the particles of the aggregate had been uniformly coated with the molten resin, 61.8 g of a straight asphalt 60–80 (a product by Shell Petroleum Co.) heated at 150° C. were introduced into the mixer followed by mixing for additional 60 seconds.

The thus obtained bituminous paving material was examined for the Marshal stability test according to the procedure specified in "Asphalt Paving Manual" by the Japanese Road Association to give the results shown in Table 1.

EXAMPLE 2

A hexamine-modified novolak-type phenol resin was prepared from the phenolic resin prepared in Example 1 according to the recipe described in Japanese Patent Publication 56-34224. Thus, a premix of the phenolic resin with about 3% by weight of hexamethylene tetramine was introduced into and mixed well in a double-screw extruder and the extruded material was spread on a belt conveyor to be cooled followed by shaping into rodlet-like forms of 2 mm diameter and 5 to 20 mm length.

A bituminous paving material was prepared and examined for the Marshal stability test in the same manner as in Example 1 to give the results shown in Table 1.

EXAMPLE 3

A resol-type phenolic resin was prepared by a known method in a condensation reaction of 470 kg of tert-butyl phenol and 447 kg of 47% formalin in the presence of sodium hydroxide as the catalyst followed by the removal of the unreacted phenol and formaldehyde as well as water and the like volatile matter under reduced pressure with heating up to a maximum temperature of 80° C. The thus obtained phenolic resin had a concentration of 80% with 3% of unreacted phenol and 0.1% of unreacted formaldehyde and had a viscosity of 3000 centipoise at 25° C.

Preparation of a bituminous paving material with the resin and the test thereof were undertaken in the same manner as in Example 1 to give the results shown in Table 1.

EXAMPLE 4

A benzyl ether-type phenolic resin was prepared in a known method by the condensation reaction of 470 kg of phenol and 479 kg of 47% formalin in the presence of lead naphthenate as the catalyst followed by the removal of the unreacted phenol and formaldehyde as well as water and the like volatile matter under reduced pressure with heating up to a maximum temperature of 130° C. The thus obtained phenolic resin was solid at room temperature and had a softening point of 60° C.

Preparation of a bituminous paving material with the resin and testing thereof were undertaken in the same manner as in Example 1 to give the results shown in Table 1.

EXAMPLE 5

A resol-type phenolic resin was prepared in a known method by the condensation reaction of 470 kg of phenol and 479 kg of 47% formalin followed by concentration in a continuous tubular dehydrator under reduced pressure until a resin containing 5% by weight of a volatile matter at 70° C. was obtained. The thus obtained resin was solid at room temperature having a softening point of 70° C.

Preparation of a bituminous paving material with the resin and testing thereof were undertaken in the same manner as in Example 1 to give the results shown in Table 1.

EXAMPLE 6

A phenoxy-modified phenolic resin was prepared by melting together 100 parts by weight of the novolak-type phenolic resin prepared in Example 1 and 5 parts by weight of a phenoxy resin having an average molecular weight of 33000 to 37000 by heating.

Preparation of a bituminous paving material with the resin and testing thereof were undertaken in the same manner as in Example 1 to give the results shown in Table 1.

EXAMPLE 7

A hexamine-phenoxy-modified phenolic resin was prepared in the same manner as in Example 2 except that the premix of the phenolic resin and hexamethylene tetramine was further admixed with 5% by weight of a phenoxy resin based on the phenolic resin.

Preparation of a bituminous paving material with the resin and testing thereof were undertaken in the same manner as in Example 1 to give the results shown in Table 1.

COMPARATIVE EXAMPLE 1

A bituminous paving material was prepared in the same manner as in Example 1 except that the preheating temperature of the aggregate introduced into the mixer was 170° C. instead of 180° C. and the amount of the asphalt was increased to 68.8 g with omission of the phenolic resin.

Testing of this paving material for the Marshal stability test gave the results shown in Table 1.

COMPARATIVE EXAMPLE 2

A bituminous paving material was prepared by first introducing 1147 g of the same aggregate as used in Example 1 heated at 160° C. into a mixer and then simultaneously introducing 6.9 g of the phenolic resin obtained in Example 6 and 65.3 g of the same asphalt heated at 150° C. followed by mixing for 60 seconds.

Testing of the paving material was undertaken in the same manner as in Example 1 to give the results shown in Table 1.

COMPARATIVE EXAMPLES 3 and 4

The same novolak-type phenolic resin, aggregate material and asphalt were used in the same amounts as in Example 1. In Comparative Example 3, the phenolic resin and the asphalt were simultaneously added to the heated aggregate material in the mixer while, in Comparative Example 4, the phenolic resin was introduced into the mixer after the addition and mixing of the asphalt with the aggregate material in the mixer.

The thus prepared bituminous paving materials were tested in the same manner as in Example 1 to give the results shown in Table 1.

TABLE 1

| | Density g/cm$^3$ | Void ratio, % | Degree of saturation, % | Stability, kg | Flow value, 1/100 cm | S/F[1] |
|---|---|---|---|---|---|---|
| Example | | | | | | |
| 1 | 2.341 | 6.2 | 68.4 | 1870 | 21 | 89 |
| 2 | 2.357 | 5.6 | 70.5 | 1850 | 20 | 92.5 |
| 3 | 2.308 | 7.3 | 64.7 | 1790 | 18 | 99.4 |
| 4 | 2.339 | 6.3 | 68.0 | 1700 | 20 | 85 |
| 5 | 2.340 | 6.2 | 68.4 | 1750 | 18 | 97.2 |
| 6 | 2.343 | 6.1 | 68.7 | 2060 | 19 | 108.4 |
| 7 | 2.354 | 5.7 | 70.9 | 1870 | 18 | 103.9 |
| Comparative Example | | | | | | |
| 1 | 2.339 | 6.3 | 68.0 | 1150 | 31 | 37.1 |
| 2 | 2.340 | 6.3 | 68.0 | 1600 | 32 | 50 |
| 3 | 2.347 | 6.0 | 69.1 | 1480 | 21 | 70.5 |
| 4 | 2.205 | 11.7 | 53.4 | 1050 | 17 | 61.8 |

[1]S/F = stiffness, a numerical measure for the deformability of the paving material given by the stress divided by strain.

EXAMPLE 8

Ten kilograms of an aggregate material prepared in the same formulation as in Example 1 and heated at 180° C. were introduced into a mixer and then 60 g of the phenoxy-modified phenolic resin prepared in Example 6 were added thereto and mixed together for 30 seconds until the surface of the aggregate particles had been uniformly coated with the molten resin. Thereafter, 540 g of the same straight asphalt as used in Example 1 and heated at 150° C. were added to the mixer and mixed together for 60 seconds to give a bituminous paving material.

The above prepared paving material was subjected to the wheel tracking test according to the procedure specified in "Asphalt Paving Manual" to give the results shown in Table 2 below.

COMPARATIVE EXAMPLE 5

The formulation of the bituminous paving material was just the same as in Example 8 but, in this case, 10 kg of the aggregate material heated at 180° C., 60 g of the phenoxy-modified phenolic resin and 540 g of the straight asphalt were introduced into the mixer at one time and mixed together for 60 seconds. The thus obtained paving material was tested in the same manner as in Example 8 to give the results shown in Table 2.

COMPARATIVE EXAMPLE 6

The experimental procedure was substantially the same as in Example 8 excepting the omission of the phenoxy-modified phenolic resin and, instead, increase of the amount of the straight asphalt from 540 g to 600 g. The results of the test undertaken with the thus prepared paving material in the same manner as in Example 8 are shown in Table 2.

TABLE 2

| | | Density, g/cm$^3$ | Void ratio, % | Degree of saturation, % | Wheel tracking test | |
|---|---|---|---|---|---|---|
| | | | | | DS, times/min. | RD, mm/min. |
| Example | 8 | 2.358 | 4.0 | 77.3 | 5820 | 0.008 |
| Comparative Example | 5 | 2.333 | 5.0 | 72.8 | 1212 | 0.035 |
| | 6 | 2.365 | 3.6 | 79.2 | 733 | 0.092 |

EXAMPLE 9

An aggregate mix was prepared in an asphalt plant according to the recipe for the granular packing density of Ascon (13) with the materials occurring in the River Ohi in amounts of: 37.7 parts by weight of #6 smashed rock; 18.9 parts by weight of #7 smashed rock; 25.3 parts by weight of coarse sand; 8.5 parts by weight of fine sand; and 4.2 parts by weight of stone powder.

Into a mixer were introduced 940 kg of the above aggregate mix heated at 180° C. and then 6 kg of the novolak-type phenolic resin prepared in Example 1 and they were mixed together for 5 seconds so as to have the particles of the aggregate coated with the resin. Further, 54 kg of the same straight asphalt as used in Example 1 heated at 145° C. were added to the mixer and mixed together for 40 seconds to give a bituminous paving material. The temperature of this paving material was 170° C. at the moment of discharge out of the mixer.

The above prepared paving material, after reservation of a portion for the Marshal stability test, was used in actual paving of a road and test specimens were taken from the pavement by cutting of which the wheel tracking test and raveling test were undertaken in accordance with the procedures specified in "Asphalt Paving Manual".

For comparison, the same preparation and testing as above were undertaken excepting the omission of the phenolic resin.

Tables 3 and 4 below summarize the results of the Marshal stability test and the road paving test, respectively, undertaken with the paving materials with (Inventive) and without (Comparative) the use of the phenolic resin.

TABLE 3

| | Density g/cm³ | Void ratio, % | Degree of saturation, % | Stability, kg | Flow value, 1/100 cm | S/F |
|---|---|---|---|---|---|---|
| Inventive | 2.355 | 5.6 | 70.5 | 1950 | 26 | 75 |
| Comparative | 2.355 | 5.6 | 70.5 | 1210 | 35 | 34.6 |

TABLE 4

| | Wheel tracking test | | Raveling test | | Actual[1] raveling after 6 months, cm |
|---|---|---|---|---|---|
| | Density, g/cm³ | DS, times/ minute | RD, mm/ minute | Density, g/cm³ | Worn-out, cm² |
| Inventive | 2.354 | 6300 | 0.01 | 2.354 | 0.120 | 0.00 |
| Comparative | 2.352 | 400 | 0.35 | 2.352 | 0.223 | 0.54 |

[1]On a road having a traffic volume of more than 3000 large-sized vehicles per day.

As is understood from the above given results, the bituminous paving material prepared according to the inventive method is practically very advantageous by virtue of the outstandingly superior resistance against plastic flow and wearing resistance in comparison with conventional bituminous paving materials. Furthermore, another great practical advantage is obtained by the inventive method in the possibility of utilizing various kinds of inexpensive aggregate materials, which have been considered not to be suitable as an aggregate for bituminous paving materials, by suitably selecting according to the desired performance of the paved road because of the improved adhesion and affinity between the aggregate material and the bituminous material such as asphalt.

What is claimed is:

1. A bituminous paving material which comprises a bituminous material as the matrix and an aggregate uniformly dispersed in the bituminous material, the particles of the aggregate material being coated with molten phenolic resin in an amount in the range of from 0.1 to 3 parts by weight per 100 parts by weight of aggregate, prior to dispersing the particles in the bituminous material.

2. The bituminous paving material as claimed in claim 1 wherein the phenolic resin is selected from the group consisting of novolak-type phenolic resins, resol-type phenolic resins and modifed resins thereof, the modified resins being modified with a phenoxy resin, and the amount of the phenoxy resin for the modification of the phenolic resin being in the range from 3 to 30 parts by weight per 100 parts by weight of the phenolic resin.

3. The bituminous paving material as claimed in claim 1 wherein the resin is a phenolic resin modified with a phenoxy resin expressed by the formula

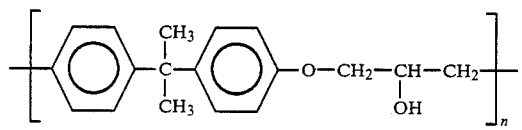

in which the suffix n is a positive integer of a value in the range of from 70 to 170, and the amount of the phenoxy resin for the modification of the phenolic resin is in the range from 3 to 30 parts by weight per 100 parts by weight of the phenolic resin.

4. The bituminous paving material of claim 1 wherein the phenolic resin coated aggregate is dispersed in the bituminous material while the phenolic resin coating is still molten.

5. A method for the preparation of a bituminous paving material which comprises the steps of:
 (a) blending 100 parts by weight of an aggregate and 0.1 to 3 parts by weight of a phenolic resin at a temperature higher than the melting point of the phenolic resin to uniformly coat the surfaces of the aggregate with molten phenolic resin, and
 (b) then directly blending the coated aggregate with a bituminous material.

6. The method as claim in claim 5 wherein the phenolic resin is a phenolic resin modified with a phenoxy resin and the amount of the phenoxy resin is in the range from 3 to 30 parts by weight per 100 parts by weight of the phenolic resin.

7. The method as claimed in claim 5 wherein the step (a) of blending the aggregate and the phenolic resin is performed at a temperature at least 60° C. higher than the melting point of the phenolic resin.

8. The method as claimed in claim 5 wherein the blending of the aggregate material and the bituminous material is performed at a temperature in the range of from 130° to 160° C.

9. The method of claim 5 wherein the step (b) is performed while the temperature of the coated aggregate of step (a) is above the melting point of the phenolic resin coating on the aggregate.

10. The method of claim 5 wherein the coated aggregate of step (a), while the phenolic resin is still at a temperature above is melting point, is blended with bituminous material in step (b) preheated to a temperature above the melting point of the bituminous material.

11. The method of claim 10 wherein bituminous material used in step (b) is preheated to a temperature at least 50° C. higher than the melting point of the phenolic resin.

* * * * *